Nov. 6, 1928.
J. G. CAPSTAFF
1,690,617
METHOD OF MAKING DUPLICATE NEGATIVES
Filed May 6, 1924    4 Sheets-Sheet 1
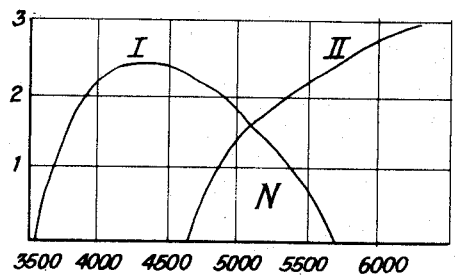
FIG_1_
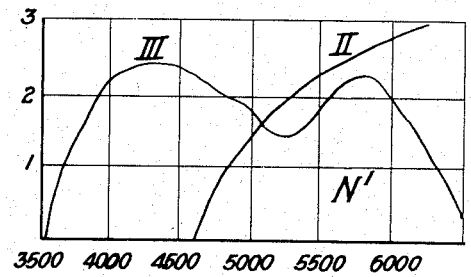
FIG_2_
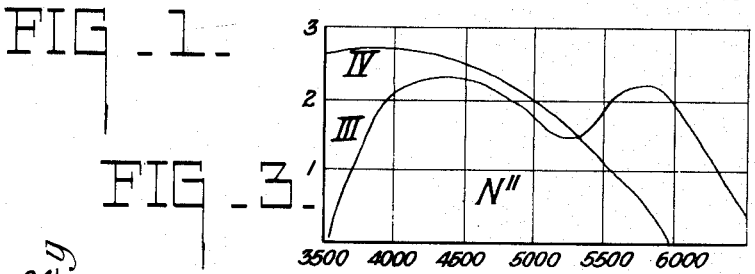
FIG_3_
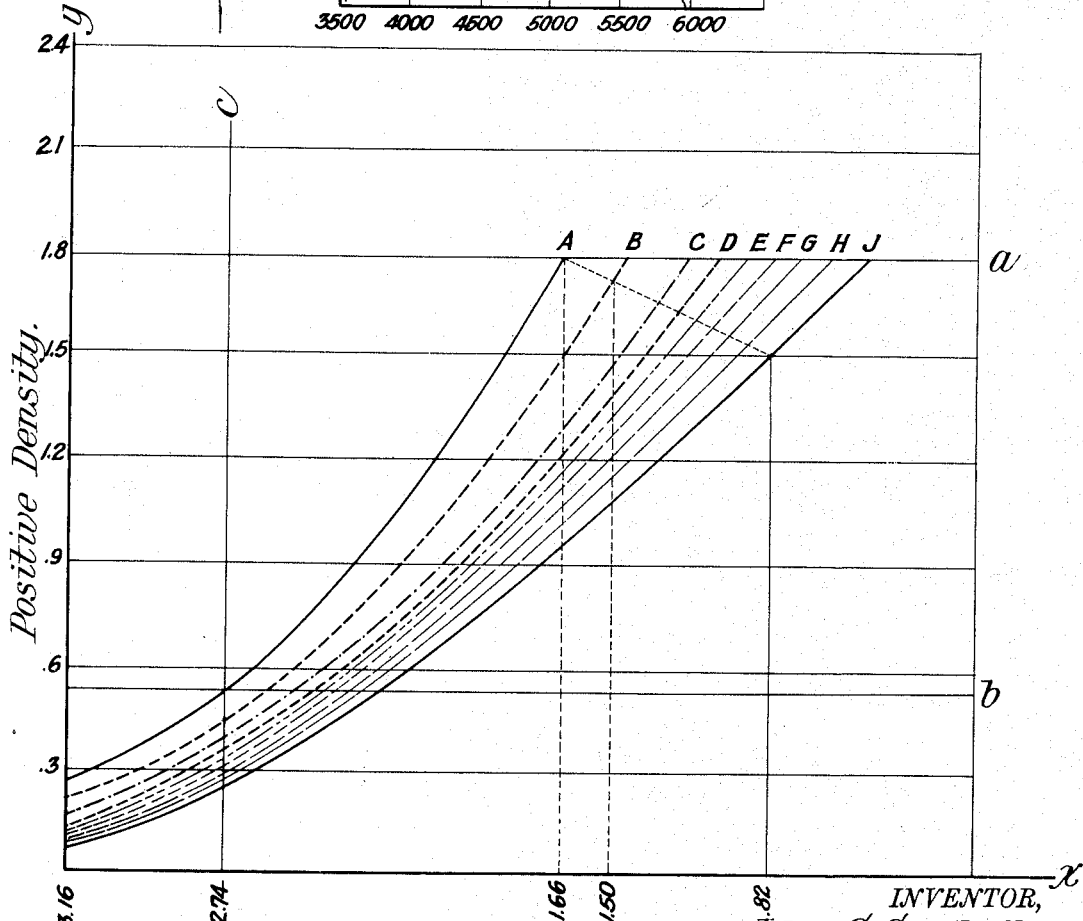
FIG_4_
INVENTOR,
John G. Capstaff,
BY
ATTORNEYS.

Nov. 6, 1928.                                                    1,690,617
J. G. CAPSTAFF
METHOD OF MAKING DUPLICATE NEGATIVES
Filed May 6, 1924                           4 Sheets-Sheet 2
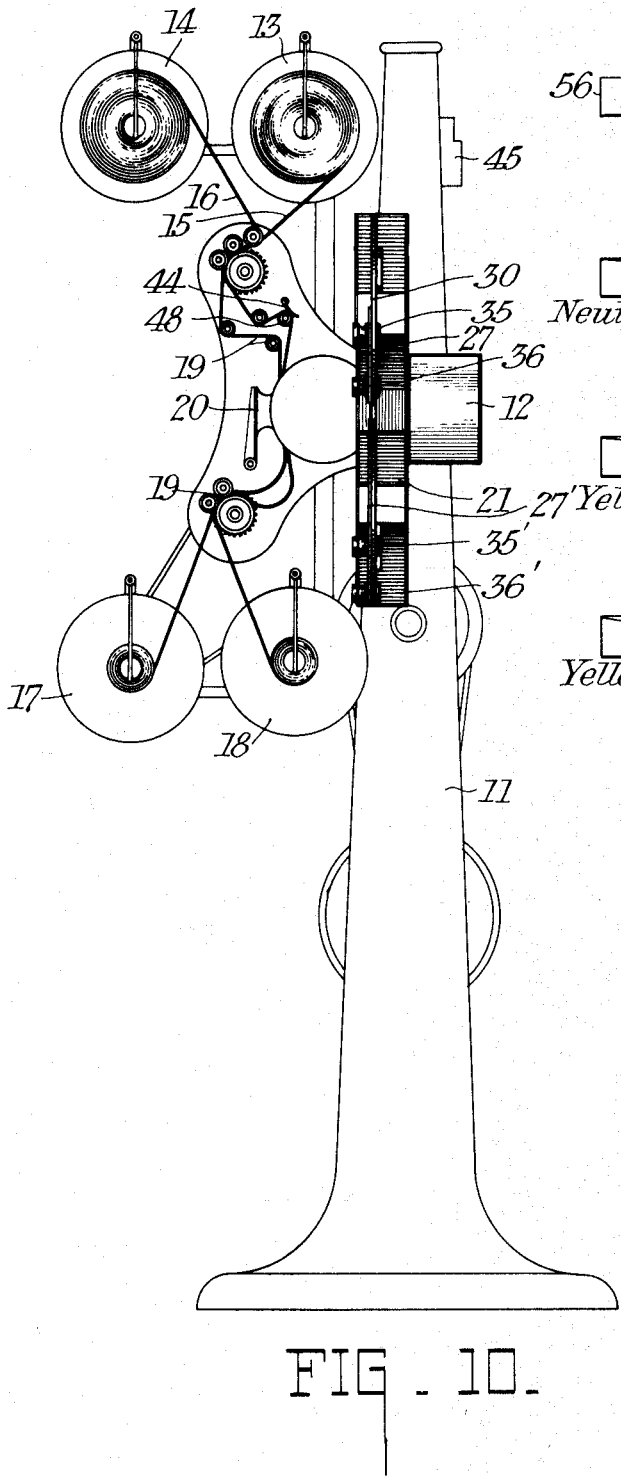
FIG. 10.
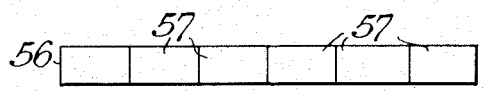
FIG. 5.
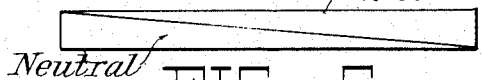
FIG. 6.
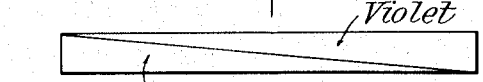
FIG. 7.
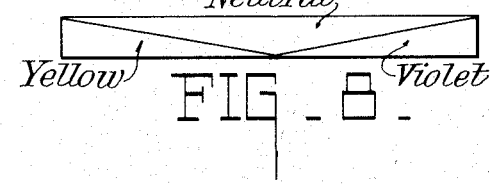
FIG. 8.
FIG. 9.
| FOOTAGE | COLOR WEDGE | DENSITY |
|---|---|---|
| 0-5 | B | 2 |
| 5-12 | A | 3 |
| 12-17½ | D | 1 |
| 17½-25 | J | 5 |
| 25-37 | E | 6 |
| 37-43 | C | 7 |
| 43-59 | B | 3 |
| 59-64 | C | 3 |
INVENTOR,
John G. Capstaff,
BY
ATTORNEYS.

Nov. 6, 1928.
J. G. CAPSTAFF
1,690,617
METHOD OF MAKING DUPLICATE NEGATIVES
Filed May 6, 1924 4 Sheets-Sheet 3
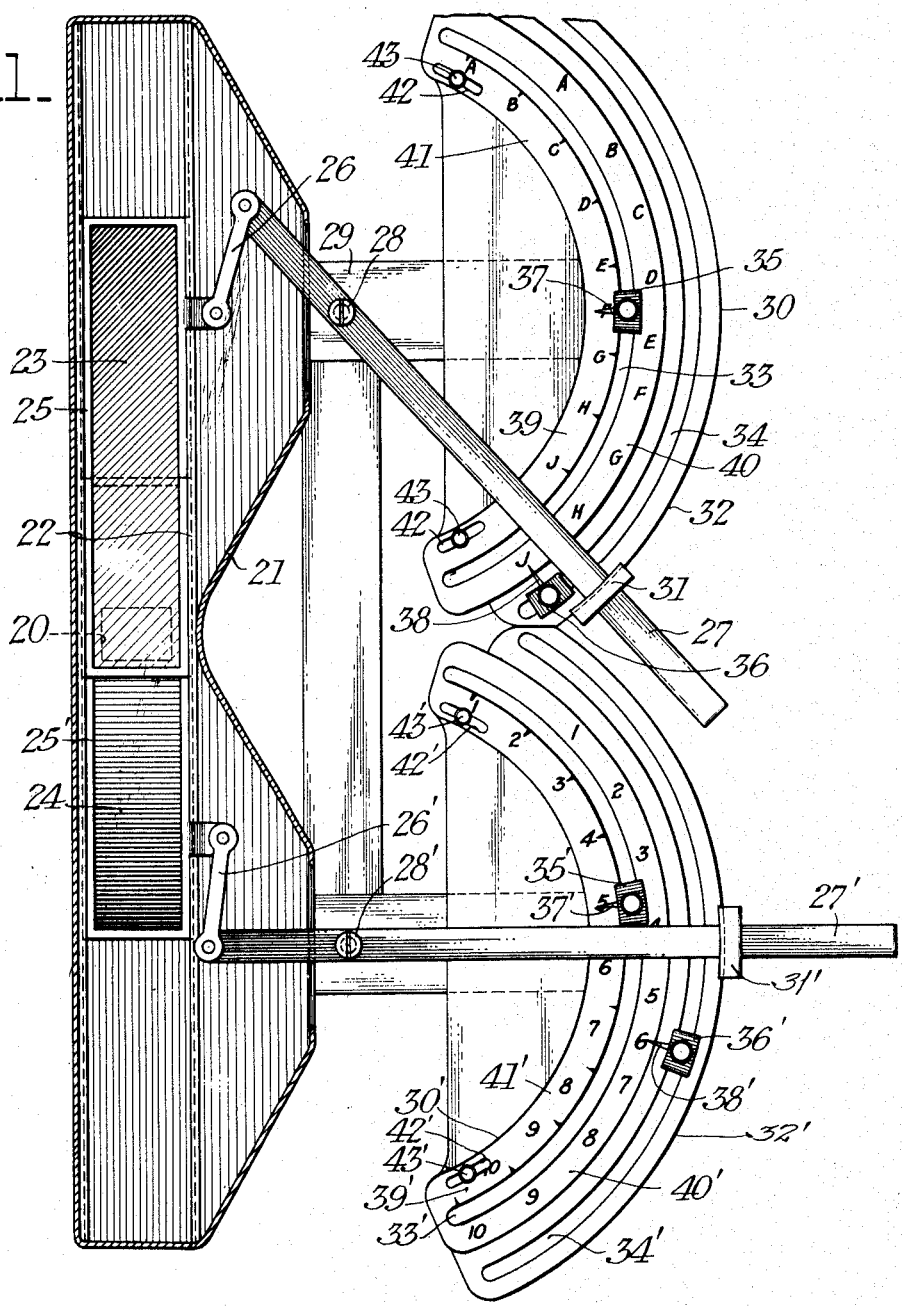
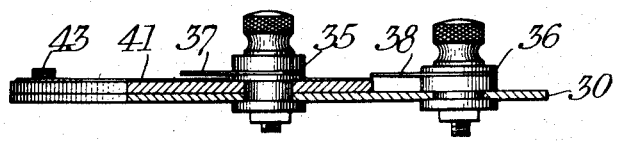
INVENTOR,
John G. Capstaff,
BY
ATTORNEYS.

Nov. 6, 1928.
J. G. CAPSTAFF
1,690,617
METHOD OF MAKING DUPLICATE NEGATIVES
Filed May 6, 1924   4 Sheets—Sheet 4
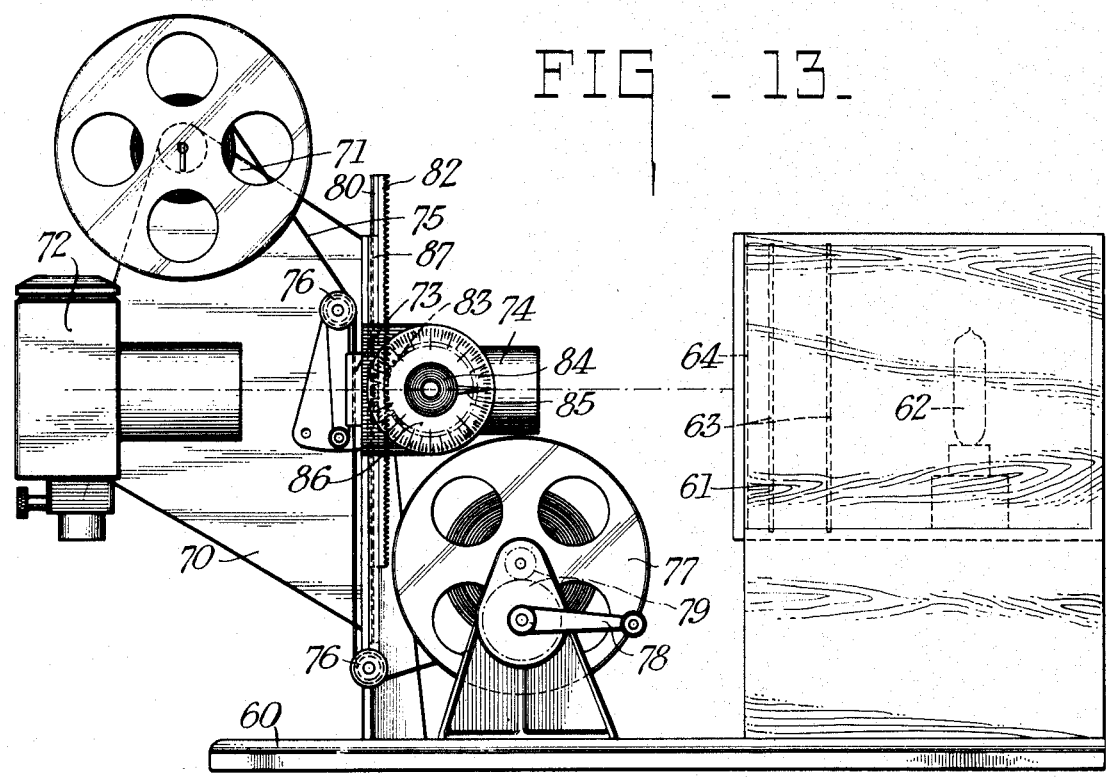
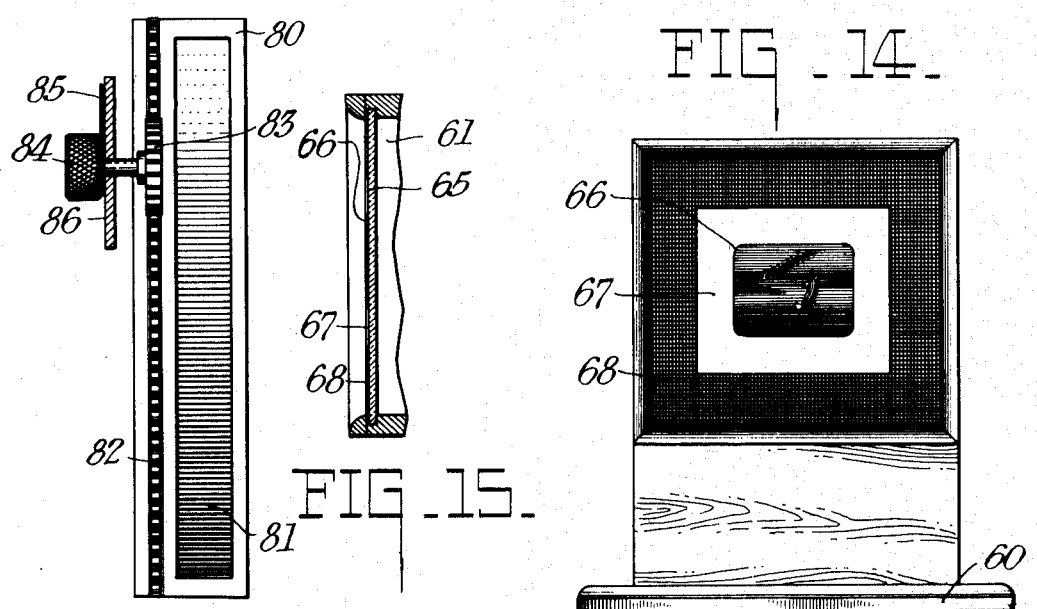
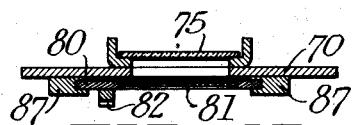
INVENTOR.
John G. Capstaff,
BY R. L. Stinchfield
N. M. Perrins
ATTORNEYS.

Patented Nov. 6, 1928.

1,690,617

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

METHOD OF MAKING DUPLICATE NEGATIVES.

Application filed May 6, 1924. Serial No. 711,480.

This invention relates to a method of and apparatus for making duplicate motion picture negatives. It is practically unavoidable that in a long film, composed of original negatives of numerous scenes and titles, exposed and developed under different conditions and at different times, the contrast and density of the images will vary considerably. The object of the present invention is to provide a method and apparatus for making a print, and particularly a duplicate negative, of uniform printing characteristics, and for which standard development treatment is employed for all scenes.

As is pointed out in my copending application 530,942, filed January 21, 1922, which has matured into Patent No. 1,598,956, granted September 7, 1926, of which this is a continuation in part, if a sensitive emulsion is dyed with a dye that absorbs light to which the emulsion is highly sensitive the emulsion is rendered particularly susceptible to control of contrast by variation of the color of the printing light. Variations of density can be controlled by variation in duration or intensity of the printing light.

I have utilized these steps in the method here disclosed and have constructed apparatus for carrying out the method. The method and apparatus will be described, reference being made to the accompanying drawings in which like reference characters refer to like parts throughout.

Figs. 1 to 4 are diagrams used to illustrate the theory underlying a part of my invention.

Figs. 5 to 8 illustrate various forms of color wedges that may be used in carrying out my invention.

Fig. 9 shows a chart used to assist an operator.

Fig. 10 is an elevation of a motion picture printer equipped for use in carrying out my invention.

Fig. 11 is a sectional view of the box containing wedges used on the above printer, and also showing the controlling means therefor.

Fig. 12 is a section showing the relation of the stops to the indicating scales on the controlling means.

Fig. 13 is an elevation of an instrument used in judging the characteristics of motion picture film.

Fig. 14 is a front view of the screen used in said instrument.

Fig. 15 is a section of said screen.

Fig. 16 shows the adjustable density wedge used in said instrument.

Fig. 17 is a section of said wedge and the gate with which it is used.

While it has been known heretofore that different contrasts in a print could be obtained by the use of printing lights of different color, the amount of control obtained in this way is very slight and may be due, in my opinion, rather to the failure of the "reciprocity law" than to the color of the light used. That is, the density of the resulting silver image does not, as is generally assumed, vary strictly as the reciprocal of the square of the exposure, but differs therefrom. Differences in contrast, similar to the differences observed by printing with different colors of light, have been found by printing with lights of different intensities and of different duration but of equal total illumination. Be that as it may, I have discovered, that a much greater and very marked difference in contrast, accompanying change in the color of the printing light only, is obtained if the emulsion is dyed with a dye that absorbs light to which the emulsion has high sensitivity, and if different colors of printing light of equal intensity are used.

I will endeavor to explain this more fully by reference to Figs. 1 to 4.

In Fig. 1, curve I represents the sensitivity of an ordinary sensitive emulsion and curve II the transmission of a certain dye, to light of different wave lengths. It will be seen that the emulsion is predominately sensitive to light of shorter wave length, such as violet and blue light, and that the dye absorbs light of these wave lengths, while the sensitivity of the emulsion extends to and the dye transmits light of longer wave length as in the blue green region, the overlapping region being marked N. If such an emulsion is dyed with such a dye, which does not have a sensitizing effect but acts only as a light screen, the proportions of violet and blue light penetrating the emulsion will be lessened, while the rays of longer wave length will penetrate the emulsion. If the plate is exposed to white light, the rays of longer wave length will affect the sensitive particles throughout the emulsion, while the violet and blue rays will affect mainly those at or near the surface, and relatively greatly increased exposure to such rays is required to render developable the grains throughout the emulsion.

If an image having a certain range of densities is printed on this emulsion by white light, it will be reproduced with a certain degree of contrast; but if the same image is printed by violet light, the resulting image will have very much less contrast. Exposure to light of wave length in the region N only will produce an image having greater contrast than exposure to white light, since it eliminates the violet rays tending to produce a flat image. It is understood that other factors affecting contrast, such as time, temperature and composition of the developing bath, are the same in each case.

If the emulsion is orthochromatic, its sensitivity curve may be of the type shown in curve III, Figs. 2 and 3. If the dye used is similar to that already discussed, the transmission being indicated by the same curve II, it will be evident from Fig. 2 that the region N' which is common to the sensitivity of the emulsion and the transmission of the dye is made greater. A much greater range of contrast may be obtained with such a combination.

An orthochromatic plate may also be dyed with a dye having a transmission curve such as is shown by IV in Fig. 3. In such a case, of course, greater contrast would be obtained by printing with a violet or blue light, and a less contrast by use of a green or yellow light, as the common area N'' is in the blue and violet.

In Figs. 1 to 3, the abscissæ represent wave lengths and the ordinates represent density of a photographic image and transmission by an arbitrary scale for comparative purposes. In practice I may use motion picture positive film such as is in general use and dye the emulsion with any suitable dye, such as that described in the patent to Clarke 1,293,039, granted February 4, 1919, in a dilution of the order of one part to 100 parts of water. The dilution of the dye may vary within very wide limits. The best dilution for a particular emulsion can be ascertained only by trial. The dye may be and preferably is incorporated with the emulsion during the manufacture of the film, and it is my intention that film having the dye in the emulsion shall be manufactured and sold for the purpose of this invention. The dye will be present in such quantity as to greatly retard the action of the light which it absorbs to the extent indicated in the discussion.

In the printer which I will describe hereafter, I use a long dye wedge or its equivalent, having for instance nine effective steps. Different forms of this wedge will be described later. I obtain, for the emulsion to be used, its characteristics when exposed to light transmitted through the wedge at each of these steps. This is done by printing on the emulsion the same sensitometric strip having a known series of densities, by a series of exposures, each through a different step of the color wedge. The resulting images are all fully developed under standard conditions and the resulting characteristic curves are plotted.

In Fig. 4 the successive curves A, B, C, D, E, F, G, H, and J indicate the results on a single dyed emulsion, of a series of exposures of the same sensitometric strip through different steps, similarly designated, of a color wedge, the ordinates, $y$, representing density in the reproduced image, and the abscissæ, $x$, density of the original image, the latter being reversely arranged.

It is assumed that a standard density contrast of 1.3 is desired in the reproduction, with a standard high light density of .5 and a standard black density of 1.8. Lines $b$, $a$, are drawn at these values intersecting all the curves. The points at which these intersect the first curve A are noted. In the figure they correspond to printing densities of 2.74 and 1.66. In other words a density contrast of 1.08 in the original resulted in a density contrast of 1.3 in the reproduction when printed through that step of the wedge which transmitted light of the longest wave length. A line $c$ is then drawn from line A, representing $x=2.74$. It is then noted for each curve how far below line $a$ it intersects this line, $c$, and at what point it has a $y$ value 1.3 greater than at this point. For instance, line B intersects $c$ at a point .05 below line $b$; while when it reaches a value .05 below line $a$, its $x$ value is 1.50. In other words a printing density contrast of 1.3 is reproduced through the second step, B, of the wedge from a density contrast of 1.24. Similarly the range for each curve is found, that for curve J, corresponding to the deepest violet step of the wedge being 1.92.

If now a particular scene is to be printed, the negative is measured for density and contrast. Assume that its greatest high light and shadow densities are 2.13 and .72. It has a contrast of 1.41, indicating that step D of the wedge should be used.

However, the density 2.13 would give a high-light density much greater than .5 when reproduced under the standard conditions. I therefore provide a density wedge or series of graded densities, and introduce before the printing light, the step most nearly equal to the difference between 2.13 and 3.75. This uniformly increases the densities of the entire image, and when the printing step is carried out under standard conditions will yield a print having a high light density of .5 and a density contrast of 1.3.

In this way a series of negatives having different degrees of contrast and having different densities can be reproduced in a series of positives having the same density in the high lights and the same degree of contrast.

In the above discussion it is to be understood that density is expressed, in the manner universally accepted in photographic literature, in terms of the logarithm of the reciprocal of the fractional transmission of incident light; and that the particular figures chosen are by way of example. I have given statements of theory which I believe to be correct; but it is of course possible that this explanation is incomplete or inaccurate. At any rate the observed facts and results are as stated, and the apparatus and methods as described are highly effective.

The complete process of making duplicate negatives will now be outlined and the apparatus used at each step and requiring particular mention will be described in connection with that step. The original negatives will ordinarily be long strips of motion picture films comprising series of scenes and titles taken and developed at different times and under different conditions and usually varying widely in contrast and density.

This negative is first examined or measured by any desired means. Any known type of comparator or densitometer may be used, but ordinarily a skilled operator can judge these factors with sufficient accuracy by examining the negative by diffused transmitted light from a suitable window. He will note the number of feet in the scene, the step of the color wedge which should be used in printing to produce suitable contrast and the step of the density wedge which should be used in printing to produce the desired high light density in the print, and will make out a chart 10, such as is shown in Fig. 9, for the guidance of the printer, and containing data in columns.

The printer used is shown in Figures 10 to 12 and has a supporting column 11, carrying a lamp box 12, supports 13 and 14 for supply reels for negative and positive film 15 and 16 and take-up devices 17 and 18. Suitable film guides, rollers and advancing means are designated generally as 19, no detailed description of these being necessary as they constitute no part of my invention. The films 15 and 16 are advanced in contact past a printing window or gate at 20. Between this gate and the lamp house 12 is a casing 21 containing vertical guideways 22 for frames 25 and 25' containing a color wedge 23 and a density wedge 24, respectively. To frame 25 is connected, by means of pivoted link 26 an operating lever handle 27 pivoted at 28 to a part 29 of the fixed printer support. This handle swings over an indicator plate 30, being steadied by the shoe 31 in contact with the arcuate guide edge 32. In the plate 30 are two arcuate slots 33 and 34, in which are adjustable blocks 35 and 36 with pointers 37 and 38 playing over scales 39 and 40, the indicating letters of which correspond to settings of the wedge 23 corresponding to the steps already fully discussed. It is to be noted that the corresponding calibrations of the two scales are offset so that the wedge will be set at the same point if the upper edge of the handle 27 contacts the lower side of block 35 when its pointer 37 is opposite a certain letter on scale 30 or if the lower edge of handle 27 contacts the upper side of block 36 when its pointer 38 is opposite the same letter on scale 40. Both scales are printed on the same card 41 which is adjustable by the slots 42 and thumb nuts 43. Since the emulsions vary in characteristics each batch of emulsion is tested and the scale 41 adjusted accordingly.

Similarly the density wedge frame 25' is connected by link 26' to handle 27' pivoted at 28' and playing over an indicator plate 30' carrying a card 41' with scales 39', and 40' opposite which are the pointers 37' and 38' carried by blocks 35' and 36' moving in slots 33' and 34'. Shoe 31' engages the guide edge 32'. The card 41' is adjustable by means of slots 42' and nuts 43'.

Opposite one of the guide rollers 48 over which the negative passes is arranged a spring 44 adapted when in contact with the roller to close a circuit, not shown, to a signal bell 45. The negative is notched at a suitable distance from the points requiring change of setting so that the bell will be sounded as the frame next before the change is moved into printing position. The operator will have the chart 10 before him, and will set up the blocks ready for the next change. If the handles are set in the position shown in Fig. 11 with the color wedge at J and the density wedge at 5, corresponding to directions at 46 on the chart 10, and the next setting 47 calls for the color wedge at F and the density wedge at 6, he will set the blocks as indicated in Figure 11 and stand with his hands on the levers ready to make the change when the bell rings. The footage readings will show him when to expect the change.

I have shown in Figs. 5, 6, 7 and 8 certain embodiments of the color wedge that have been found useful. This contrast-controlling screen may consist of a strip of film having different areas differently colored as indicated in Fig. 5. In this case a film 56 is shown having a series of areas 57, having different color transmission characteristics. If desired the screen may be of the wedge type as indicated in Fig. 6, where a wedge of violet is shown. Attached to this and oppositely arranged is a neutral wedge, the densities of the wedges being so balanced that the printing time is uniform for any position of the wedge, but the resulting contrast will vary. As shown in Fig. 7, the screen may be made of two oppositely directed wedges transmitting light of color having opposite effects such as yellow and violet. Still another type of wedge is shown in Fig. 8, in which the violet wedge is placed point to point to the yellow wedge and both balanced by a neutral wedge. It is to be understood that with any of the above described wedges or screens, printing light transmitted through the yellow wedge tends to increase the contrast of the resulting print and violet light tends to diminish it. That is, the yellow light penetrates into the emulsion and tends to render developable grains distributed throughout the layer while the action of the violet light is restricted rather closely to the surface. As the emulsions most used for printing are sensitized strongly for blue, the contrast of the resulting print can be controlled in a remarkable manner if the film is dyed yellow. Normal exposures will then be made through the central part of the wedge shown in Figs. 7 or 8. If the negative is flat, exposure is made through the yellow end of the wedge to increase contract, and if it is too contrasty the violet end is used. If the screen is of the type shown in Fig. 5, the areas are made so that they will correspond to a series of sections taken along wedges of the type disclosed in Figs. 6, 7 and 8. In any of the disclosed screens I find it desirable that the adjustment of the wedge shall not affect printing time but only the contrast, and this end is attained by the use of the balancing neutral wedge. It is to be understood that Figs. 6 to 8 are diagrammatic and the wedges are made very long and tapering.

It is obvious that an exposure made through the right hand end of the filters or wedges shown in any of these figures is made by violet light only and its action restricted to the surface, and that as the filter is moved across the beam, more and more additional light, which is of all colors if the wedge of Figure 6 is used or yellow if the wedge of Fig. 7 is used, is added to the violet light and acts more and more throughout the film. Since the normal exposure is made through the central area of the filter it is made in part by violet light, the action of which is restricted to the surface and in part by light of other wave lengths, particularly yellow, the action of which is distributed through the sensitive layer.

The film exposed in the printing machine that I have just described will be developed under standard conditions and will yield a positive print corrected for contrast and density in accordance with the observations made on the original negative. This print may be used in the customary way for projection. I contemplate its use, however, for the making of a duplicate negative. Through error in determining the characteristics of the original negatives or by mistake of the printing operator, the positive may not be uniform and before making a negative I examine the positive upon an instrument which I will now describe.

Upon a base 60 I support a housing 61 containing a lamp 62 in front of which are two light diffusing screens 63, such as ground glass, and a small projection screen 64. The latter consists of an opal glass sheet 65 to the front of which is centrally attached an opaque sheet of material 66. This may be a heavy coating of paint. The front surface is highly reflective and may be white or have a metallic lustre. Around this central area 66 is a clear border 67, and surrounding this is a black opaque border 68.

The base 60 also carries a support 70 carrying a film reel support 71 and a projection lamp house 72 in front of which is a film gate 73 and objective 74. Film 75 may be guided from a reel on the support 71 past the gate by means of guide rolls 76 and thence to a take up reel 77, where it may be moved by handle 78 and multiplying gear 79. Between the gate and objective is mounted a frame 80 sliding in guide 87 and carrying a density wedge 81 and adjustable vertically by means of rack 82 and pinion 83, the latter being actuated by thumb nut 84, carrying a pointer 85 movable over scale 86.

The film to be judged is passed through this projector and a typical frame from each scene is projected upon the area 66. The parts of the apparatus are so proportioned that the picture projected will be in focus on and just fill the area 66. The border 67 will always have the same illumination from lamp 62 and the picture on area 66 is judged, or compared, under this condition. The density wedge and the lamps are so chosen that if no film is in place the light projected through the densest part of the wedge on the light reflecting area 66 will match the transmitted light of border 67.

The film is held stationary while the single frame is inspected. This is first projected through the highest density of the wedge. The scene will appear like a very dark print on paper mounted on a white mount. Less density is then introduced until the print appears as a good print on a white mount. Sample frames are thus examined. If too little density is used, the border or mount will appear grey. The density wedge is shifted back and forth until the scene balances for density with its white mount, and the setting of the wedge is then noted. At the same time the contrast of the print as actually projected is noted and if it is too flat or too contrasty this can be corrected in the second printing. The observer makes a chart such as is shown in Fig. 9, similar to the one used in the first printing, for guiding the printing operator.

This method of judging the positives is in some respects preferable to an actual reading of densities because it takes into account the effect produced on the observer under a standard projection condition. Some scenes have purposely flat or contrasty settings which a mere reading of density measurements does not take into account but which a projection of the picture makes apparent. Moreover density and contrast readings made by diffused light differ from those made under projection conditions with light transmitted through a condenser. This factor has been denoted in the photographic literature as Callier's Q; and is taken into account by this instrument.

When the chart 10 has been made up it is sent with the roll of positive film to the printing operator who makes the duplicate negatives by repeating the printing operations already fully described.

It is obvious that numerous variations are possible in the several steps of the process and in the apparatus used in carrying it out; and that the several steps and instruments have other uses. I consider all the herein described details as parts of my invention and also the applications of such parts to other uses. I also contemplate as part of my invention all such modifications and equivalents as are covered by the appended claims.

Having thus described my invention, what I claim as new and desire to secure by Letters Patent, is:

1. The method of making a photographic print of corrected contrast from an image bearing layer that includes the steps of determining the contrast of such image and light printing such image upon a layer predominantly sensitive to certain wave lengths, and containing a dye absorptive of light of such wave lengths, the light used in printing being adjusted to comprise more or less light of said wave lengths in accordance with the determination of such contrast.

2. The method of making a photographic print of corrected contrast from an image bearing layer that includes the steps of determining the contrast of such image and light printing such image upon a layer predominantly sensitive to blue and violet light and containing a dye absorptive of blue and violet light, the light used in printing being adjusted to comprise more or less blue or violet light in accordance with the determination of such contrast.

3. The method of making photographic prints from an image bearing layer that includes the steps of determining the contrast of such image, adjusting in accordance with such determination a screen having different color transmitting characteristics in different portions thereof, and exposing to light transmitted from said layer and through said adjusted screen a layer predominantly sensitive to certain wave lengths and containing a dye absorptive of light of such wave lengths.

4. The method of making photographic prints from a light transmitting, image bearing layer that includes the steps of determining the contrast of such image, adjusting in accordance with such determination a filter transmitting light in certain spectral regions and having different color transmission characteristics in different portions thereof and exposing to light transmitted through said layer and said adjusted filter a layer sensitive predominantly to light in the said certain spectral regions and containing a dye absorptive of light in said regions.

5. The method of making photographic prints from a light transmitting, image-bearing layer that includes the steps of determining the contrast of such image, adjusting in accordance with such determination a filter having different transmission characteristics as to blue and violet light in different portions thereof, and exposing to light transmitted through said layer and said adjusted filter a layer sensitive predominantly to blue and violet light and containing a dye absorptive of blue and violet light.

6. The method of making a series of photographic prints of corrected contrast from a series of images of varying contrast that includes the steps of determining the contrast of the images, and light printing said images upon a sensitive layer having high sensitivity to certain wave lengths and containing a dye absorptive of light of such wave lengths, the light used in printing each image being adjusted to comprise more or less light of said wave lengths in accordance with the contrast of said image.

7. The method of making a series of photographic prints of corrected contrast from a series of images of varying contrast that includes the steps of determining the contrast of the images, and light printing said images upon a sensitive layer having high sensitivity to light of the violet and blue region of the spectrum and containing a dye absorptive of light of the violet and blue region, the light used in printing each image being adjusted to comprise more or less light of the violet and blue region in accordance with the contrast of the image.

8. The method of making a series of photographic prints with corrected contrast and density from a series of images of varying contrast and density that includes the steps of determining the contrast and greatest density of the images, and light printing said images upon a sensitive layer having high sensitivity to certain wave lengths and containing a dye absorptive of light of such wave lengths, the light used in printing each image being adjusted to comprise more or less light of said wave lengths in accordance with the contrast of the image, and the intensity of the light being adjusted in accordance with the greatest density of the images.

9. The method of making a series of duplicate negatives of corrected contrast from a series of original negatives of varying contrast that comprises the steps of determining the contrast of the original negatives, printing from these upon a sensitive layer having high sensitivity in a certain region of the spectrum and containing a dye absorptive of light in said region by means of light adjusted to comprise more or less light of said region in accordance with the observed contrast of the several images, developing positive images in said emulsion, projecting said images by means of a light of variable intensity upon a screen area adjacent another evenly illuminated area, whereby the contrast and density of the projected images may be observed, and then reproducing therefrom a second series of negative images corrected for density and contrast in accordance with such observations.

10. The method of making a series of photographic prints of corrected contrast from a series of light transmitting images of varying contrast that includes the steps of projecting said images by light of controlled variable intensity upon a screen area adjacent an area of standard illumination, whereby the contrast and density of the images may be observed, printing from these images upon a sensitive layer having high sensitivity in a certain region of the spectrum and containing a dye absorptive of light in said region, the printing light being adjusted to include more or less light of such region in accordance with the observed contrast of said images, and the intensity of the printing light being adjusted in accordance with the observed density of the said images.

11. The method of making a photographic print having desired characteristics from an image bearing layer that comprises the step of light printing such image upon a layer predominantly sensitive to certain wave lengths and containing a dye absorptive of light of such wave lengths, the light used in printing being adjusted to comprise more or less light of said wave lengths in accordance with the desired characteristics and containing also light of other wave lengths in a controlled amount.

12. The method of making a photographic print having desired predetermined characteristics from an image bearing layer that includes the step of exposing a layer, predominantly sensitive to light of certain wave lengths and containing a dye absorptive of light of such wave lengths, to light passing through such image bearing layer and composed of a definite predetermined proportion of violet light and also of a definite predetermined proportion of light of longer wave length than violet, the proportions of light of the different wave lengths being definitely predetermined in accordance with the desired characteristics of the resultant image in the sensitive layer.

13. The method of making a photographic print having desired predetermined characteristics from an image bearing layer that includes the step of exposing to printing light from said layer an emulsion layer having a high sensitivity to light of a particular region of the spectrum and also sensitive to light of another region of the spectrum, said emulsion containing a dye highly absorptive of light of said particular region and highly transmissive of light of said other region, said printing light comprising a mixture of light from said particular region and from other regions in definite proportions predetermined in accordance with the desired characteristics of the resultant image in the emulsion layer.

14. The method of making a photographic print having desired, predetermined, contrast characteristics from an image bearing layer that includes the step of exposing to printing light from such layer an emulsion layer, the sensitivity of which is predominant to violet light but extends through the yellow region of the spectrum and containing a dye that is highly absorptive of violet light and highly transmissive of yellow light, said printing light comprising a mixture of violet light and of light of longer wave length in definite proportions predetermined in accordance with the desired contrast characteristics of the resultant image in the emulsion layer.

15. The method of making a photographic print having desired, predetermined, contrast characteristics from an image bearing layer that includes the step of exposing to printing light from such layer an emulsion layer, the sensitivity of which is predominant to violet light but extends through the yellow region of the spectrum and containing a dye that is highly absorptive of violet light and highly transmissive of yellow light, said printing light comprising a mixture of violet light and of yellow light in definite proportions predetermined in accordance with the desired contrast characteristics of the resultant image in the emulsion layer.

16. Apparatus for printing motion picture film and comprising a source of light, means for directing a defined beam of printing light from said source, means for advancing an image-bearing film and a sensitive film through said beam, and a filter means adjustably mounted across said beam and having different color transmitting characteristics in its different portions, the said characteristics having at most only a slight variation over an area of the filter means equal to the area thereof intercepting the defined beam.

17. Apparatus for printing motion picture film and comprising a source of light, means for directing a defined beam of printing light from said source, means for advancing an image bearing film and a sensitive film through said beam, and a light transmitting screen adjustably mounted across said beam between the light and the position of the sensitive film and having different transmission characteristics as to blue and violet light in its different portions, the said characteristics having at most only a slight variation over an area of the screen equal to the area thereof intercepting the defined beam.

18. Apparatus for printing motion picture film and comprising a source of light and a printing window illuminated thereby, means for advancing film past said printing window, and a filter means adjustably mounted between the light and the position of the film at the window and having different light transmitting characteristics in its different portions, there being at most only a slight variation in such characteristics over an area equal to the printing beam.

19. Apparatus for printing motion picture film and comprising a source of light and a printing window illuminated thereby, means for advancing film past said window, and a filter adjustably mounted between the light and the position of the film at the window, and having different transmission characteristics as to blue and violet light in its different portions, the said characteristics having at most only a slight variation over an area of the screen equal to the area of the printing window, operating means for controlling the adjustment of the filter and an adjustable scale cooperating with the operating means.

Signed at Rochester, New York, this 2nd day of May, 1924.

JOHN G. CAPSTAFF.